A. BARBARIN.
GAS BURNER.
No. 81,733. Patented Sept. 1, 1868.
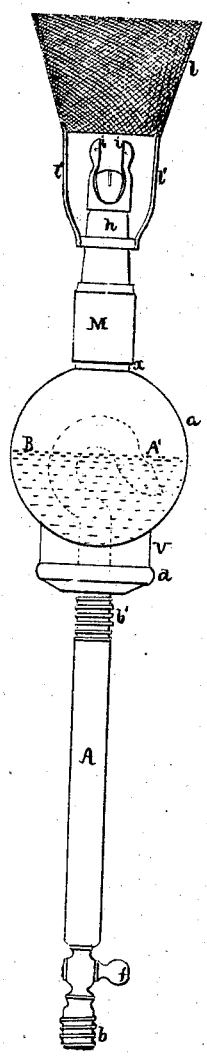
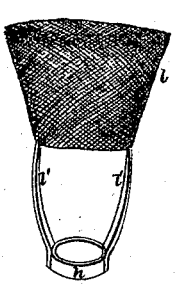
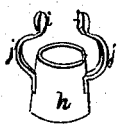
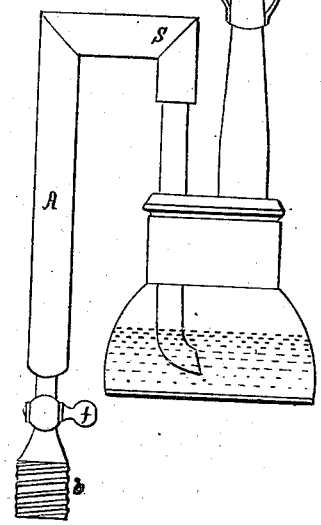
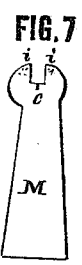

United States Patent Office.

ARTHUR BARBARIN, OF NEW ORLEANS, LOUISIANA.

Letters Patent No. 81,733, dated September 1, 1868.

IMPROVEMENT IN GAS-BURNERS.

The Schedule referred to in these Letters Patent and making part of the same.

TO WHOM IT MAY CONCERN:

Be it known that I, ARTHUR BARBARIN, of New Orleans, in the parish of Orleans, and State of Louisiana, have invented certain new and useful Improvements in Self-Opening, Self-Igniting, and Self-Closing Gas-Burners; and I hereby declare the following to be a full, clear, and exact description of the same, reference being had to the accompanying drawings.

The object of my invention is to produce a practicable self-opening, self-igniting, and self-closing air-tight burner for gas-lamps, chandeliers, &c., to dispense with the use of electricity, and with other methods of opening, igniting, and extinguishing public or other gas-lamps, as the case may be.

To obtain such favorable and effective results, I employ hydrogen-gas and ordinary gas-burners, with any of the following-named substances, or their equivalents, arranged to operate as hereinafter explained, to wit:

Glass, carburetted oil, glycerine, quicksilver, coal-tar, platinum in sheet, ribbon, wire gauze, or in a finely-divided or spongy state, magnesia, lime, chalk, or any other material or materials possessing the property of producing the same result.

Quicksilver, it is well known, is the only metal which is liquid at common temperature, and owing to this peculiar property, and to its freezing-point being 40° below zero, I find it to be a first-rate substitute for the stop-cocks of gas-burners, when applied and used, as hereinafter described, to prevent the air entering gas-pipes, and to prevent the gas contained in those pipes during the day from forcing its way out, unless the pressure of the gas is sufficiently increased to overcome the weight and displace the quicksilver from the curved or hook-shaped end A' of the section-pipe A, after the proper adjustment of the same with the quicksilver has been effected.

In order that I may be more clearly understood, I will suppose that the ordinary pressure of gas in a large city, for the day's consumption of private and other burners, is equal to fifty pounds by weight. In such a case, each hook-shaped or curved end A' of the pipe A, used for street or other public burners, must be sunk deep enough into the quicksilver or substitute, contained in the reservoir $a$, to prevent that pressure of gas from raising or displacing said quicksilver, and liberating itself. But if an additional pressure of gas be added to the fifty pounds of pressure for which the hook-shaped or curved end A' has been adjusted, then the quicksilver will be displaced, and the gas will liberate itself, and supply the burner so long as that excess of pressure is supplied through the main and branch-pipes. But as soon as this excess of pressure is withdrawn, the quicksilver or substitute, being heavier than the first fifty pounds of gas-pressure, at once returns to its first position, which recloses the opening of the curved end A' air-tight, and keeps it so closed until the additional pressure is again applied.

When illuminating-gas is desired for lighting churches, dwellings, &c., and hydrogen-gas is the only gas manufactured at the works, the transformation of that gas into illuminating-gas can easily be accomplished, with hardly any perceptible cost, by simply substituting common gasoline or other cheap carburetted oil, for the water contained in the ordinary water-meter of each building, which oil will not congeal in cold weather, as is the case with water.

By substituting gasoline or other cheap carburetted oil for the quicksilver contained in the reservoir $a$ of my burner, it will serve the double purpose of producing brilliant illuminating-gas, and of preventing the entrance of air within the branch-pipe to which the same may be attached, after the supply of the hydrogen-gas has been cut off from said branch-pipe. The light produced by this carburetted hydrogen is much more brilliant than the ordinary coal-gas, especially when the hydrogen is made to pass through naphtha; and by substituting a strong solution of glycerine, or pure glycerine itself, or coal-tar, for the oil or quicksilver placed in the reservoir $a$, it will act as well for a stop-cock, and will not congeal in cold weather.

As to platinum, whether in sheet, wire, ribbon, or gauze, or whether in a spongy or finely-divided state, it is so infusible that no considerable portion of it can be melted by the strongest heats of furnaces. It is unchangeable in the air and water, nor does a white heat impair its polish. It is therefore admirably fitted for emitting a brilliant light when highly heated. Unlike most other substances, it does not combine with oxygen; it may therefore be kept highly heated for an indefinite length of time without being consumed. When a clean surface of platinum is presented to a mixture of hydrogen and oxygen-gas, it has the property of causing them to combine with such rapidity as to render the metal red hot. Spongy or finely-divided platinum, as it is usually called, is most effective in producing this result, and a jet of hydrogen-gas directed upon it may be inflamed by the metal thus ignited.

In consequence of the property of platinum to emit a brilliant light when highly heated, without being impaired, and of the spongy or finely-divided platinum to cause the rapid union of hydrogen-gas with the oxygen of the atmosphere, I apply over the jet or orifice of an ordinary gas-burner, a basket of platinum gauze in connection or combination with spongy or finely-divided platinum, (to form one or more devices,) in such a manner that when the hydrogen-gas is discharged from the jet or orifice of the burner, it shall meet the spongy platinum or its equivalent, and ignite itself instantly, after which the flame of the burning gas shall find itself within the basket or in any other way in immediate contact with the walls of the platinum basket, heating it intensely, and causing it to shine with a most brilliant light. Instead of a platinum basket or other devices of the same metal, I also contemplate applying over the jet or orifice of the gas-burner a cylinder or any other device of magnesia, lime, or chalk, (or of any other material to produce the same effect,) in combination with the spongy or finely-divided platinum, or its equivalent, to ignite the gas, and to emit an equally brilliant light.

But my invention will be more readily understood by referring to the annexed drawings, forming a part of this specification, in which—

Figure 1 represents one of my burners complete in all its parts and ready for operation.

A is the upper section of a street or other branch-pipe, screwed at $b'$ through the thick-headed and threaded nut $d$, upon the glass, wooden, or metal reservoir $a$, which nut $d$ is screwed to a threaded ring secured around the lower and larger neck V of the reservoir $a$, as shown upon the drawings. Upon the upper and smaller neck $x$ of this reservoir is secured another threaded metal ring, upon which is screwed an ordinary gas-burner, M. Within said reservoir $a$, as will be seen, the upper part or curved end $A'$ of the pipe A is placed, bent in the shape of a hook, with its opening somewhat turned up, in order that the same may readily be sunk into the quicksilver B, or its substitute, contained in the reservoir; so as to close the opening or orifice of that end air-tight when not in use. When the burner is to be used, a certain additional pressure of gas, applied through the section-pipe A, displaces the quicksilver or its substitute, from the opening in the bent end of the pipe, which quicksilver or substitute is kept displaced from that point so long as that additional pressure of the gas shall continue, in order that the gas may escape through the jet $c$ of the burner M, to meet the spongy or finely-divided platinum $i$ $i$, (placed as shown on each side of the burner,) so as to ignite itself instantly. When this takes place its flame will be within or in immediate contact with the platinum-gauze basket $l$, or substitute, which will become intensely heated, and shine with a brilliant light.

The depth to which the curved ends $A'$ and Z of figs. 1 and 5 should be sunk into the quicksilver or substitute, may be regulated beforehand, according to the pressure of gas the liquid will have to resist before the additional pressure is applied to overcome the weight of the liquid; and the quantity of quicksilver or its substitute employed for any single burner, is of course to be determined by the size of the reservoir $a$, and by the pressure of gas used.

By screwing or unscrewing the section-pipe A at $b'$, fig. 1, the bent end $A'$ may be raised from or lowered into the quicksilver or its substitute at pleasure. $f$ is an ordinary gas-stop cock, to be closed only when the reservoir $a$ and quicksilver B are withdrawn from the pipe, to prevent the loss of gas during their withdrawal, but as soon as they are replaced in position for operation, the stop-cock is again turned open, and left so until the reservoir and quicksilver are again to be withdrawn, which need not be done unless the reservoir should be broken or should leak. At $b$, screw-threads are cut upon the lower ends of the pipes A, (figs. 1 and 5,) to facilitate their application to branch-pipes provided with interior corresponding screw-threads. Instead of applying the larger neck V, nut $d$, and section-pipe A to the bottom of the reservoir $a$, if desirable, they may be applied elsewhere on the reservoir, above said bottom.

And instead of applying a separate nut, $d$, to the metal ring on the neck V, both can be cast into one solid or single device to be applied as before to the neck V, and the reservoir $a$ in that case, instead of being constructed as shown, should be constructed in two (2) distinct parts, to be screwed together at the centre, so as to facilitate the introduction of the section-pipe A through the threaded hole $d$ of the lower section of the reservoir, and have its hook-shaped end within that section, and within the reservoir, after the two parts of said reservoir are screwed together to represent one shell; the section-pipe being then adjusted as before stated.

Figure 2 represents two spongy platinum pockets $i$ $i$, each provided with a small arm, $j$, secured to the ring $h$, to be placed upon the burner M, as shown at fig. 1. These pockets, with their supports $j$ $j$, may be constructed of metal, porcelain, glass, lava, soapstone, &c., and may be of any size and shape. When made of metal or of any other single substance, the pockets may be formed upon the burner itself, on each side of the jet or orifice $c$, by causing the material to project a little above and between the jet, for the purpose of drilling the holes on each side of the projections, as shown at fig. 7.

When constructed as shown at figs. 2 and 8, it will be seen that the spongy platinum and the gauze basket form two distinct or separate devices, and are therefore applied separately to the burner M, fig. 1.

Figure 3 represents the platinum-gauze basket constructed in the shape of a bat's-wing flame.

$l$ is the basket, $l'$ $l'$ the wire supports, and $h$ the ring, all to be placed upon a burner, M, as shown at fig. 1, in order that the spongy platinum, or equivalent, may find itself near the entrance of the hollow basket, or within said basket or its equivalent, for the purposes before stated. Instead of a plain ring, $h$, if it be desirable, the interior of the same may be threaded, so as to be screwed upon the burner provided with a corresponding screw-thread.

This modification may be applied to the rings of the platinum pockets when they form separate devices with the light-emitting substances, or to the rings of both when they form but one device.

Figure 4. A represents a cylinder, of magnesia, lime, chalk, or of any other substance, with an open and enlarged top, and provided with supports $l'$ $l'$ and elongated ring $h$, upon which ring are secured two pockets, $i$ $i$, to receive and to hold the spongy platinum or its equivalent. As will be seen, these form but one device, while figs. 2 and 3 form two distinct devices.

Instead of an open and enlarged top, the cylinder A may have the same closed and perforated, or closed without perforations, and the top, if desirable, may have more of a conical shape. I do not, however, limit myself to any particular size or shape of any of these light-emitting substances, as they may be constructed to suit the taste and the burners to which they should be applied.

Figure 5 is a modification of fig. 1, as much as relates to the reservoir $a$ and to the arrangement of the section-pipe A.

In this figure it will be seen that the glass reservoir has a flat bottom and but one top neck, to which neck is secured a threaded and elongated metal ring, $c$, upon which ring is screwed the thick-headed cap $b$, provided on one side of its top with a short-threaded shank, W, upon which is screwed the ordinary burner, M, and on the other side of the top with a screw-tube, R, having its lower end, Z, somewhat bent or curved, that the quicksilver, B, or its substitute, contained in the reservoir $a$, when displaced from the opening $z$ of the tube, may not (while vibrating and jumping under the pressure of the gas) enter within said screw-tube and hang upon its wall, which is mostly the case when the quicksilver is impure. This screw-tube R is, however, to be adjusted by lowering or raising the same, as explained in fig. 1. But a small elbow, S, may be attached to the section-pipe A, as shown upon the drawings, that the same may be screwed or otherwise connected to the upper part of said screw-tube R, before or after being applied to the supply-pipe by means of the threaded end, $b$. I do not confine myself to any particular size or shape of this screw-tube, as it may be made straight, with or without an enlarged lower opening, to dip into the quicksilver or substitute, instead of having its lower end somewhat curved, as shown upon the drawings. I may also have to apply a check-nut to the outside part of this screw-tube, next to the cap $b$, to keep said tube from having any loose play after being adjusted. A similar check-nut may be applied to the section-pipe A, at $b$, fig. 1, for the same purpose.

Upon the burner M, as shown, is placed a conical platinum-wire coil, D, supported by arms $l'$ $l'$, attached to the elongated ring $h$. Upon the same ring, $h$, opposite to each other, and supported by two small arms, are the two pockets $i$ $i$, to receive and to hold the spongy platinum or its equivalent, above or near the jet of the burner M. The whole is arranged, as in fig. 4, to form one device.

Instead of the wire coil, I may, if I desire it, employ a thin and narrow ribbon of platinum, formed in the shape of a cone, as shown at fig. 6; but I shall, at the same time, reserve the right to give to the platinum ribbon, wire, gauze, or sheet, any shape best suited to the burner to which it is to be applied.

I am aware that quicksilver has been used in connection with some gas-burners, but with other mechanical arrangements to regulate the flow and the consumption of the gas, and not combined and arranged as herein described, to operate as a substitute for the ordinary gas-stop cocks of burners, to prevent the entrance of air within the street or other public pipes or lamps, and at the same time to prevent the gas contained in those pipes from escaping through the street or other public burners during the day, while private or other burners supplied with gas through the same main pipe are being used.

I am also aware that platinum, in sheet, wire, gauze, or ribbon, and that cylinders, &c., of magnesia, lime, chalk, &c., have already been used in connection with gas-burners; but not in combination with spongy or finely-divided platinum, arranged to operate as herein set forth.

And now, after having explained my invention, it will be seen that my burner or burners can practically be made to open themselves, to ignite themselves, and to close themselves, at will, and air-tight, and especially to re-ignite the gas at any time that it may be blown out. They can therefore be applied with perfect safety to street or other lamps, and they can be made, at will, to open and ignite all street or other lamps at a given time, as well as they can be made to close those lamps, air-tight, without the employment of extra main or branch-pipes, and without the use of electricity. But if desirable, especially when a large number of burners are used, as in lighting a city, a different and extra main pipe and branches may be employed, for the especial supply of gas to the street-lamps, as, in that case, any number of lamps can be placed under the control of one man at a main or central station, and the lamps be lighted or not, at the will of that man, without interference with other public or private lights. In such a case two main gas-stoppers can be used, in order to regulate the flow of the gas through either side of the two main pipes independently of the other. In this last case, the adjustment of the curved ends, A' and Z, of the section-pipe A, figs. 1 and 5, need not be sunk as deep in the quicksilver or its substitute as when but one main pipe and branches are used, because in this case the pressure of the gas is completely cut off during the day, and only applied in the evening, while in the other case a certain pressure of gas must be supplied during the day for private or some other burners, while the additional pressure is only applied in the evening for the night's consumption of all gas-lamps.

While my burners, in this application for a patent, seem to have been constructed with a view to operate mostly with hydrogen-gas, for street and other public lamps, they are as effective to operate with other gas, and can be employed as well for either; and, while the ignition of the hydrogen-gas, as herein explained, is effected through the agency of the spongy platinum or its equivalent, either gas may be ignited, with equal success, by means of electricity, if it should be desired to employ that mode of igniting the gas.

I am aware that gas-burners have heretofore been combined with reservoirs containing a hydrocarbon-liquid, and that the upper ends of the gas-conduits have been made adjustable within the reservoirs; but the object of such inventions, and the only result obtained by them, has been to carburet the gas or to increase its illuminatingproperties, the flow of gas to the burner being regulated in the usual manner. But the principle of my invention is different. Whether the liquid possesses carburetting-properties or not, it is intended to regulate the flow of the gas to the burner, and the column of liquid must bear the relation to the pressure of gas in the conduit hereinbefore fully set forth. The adjustability of the end of the conduit is not intended for the purpose of effecting the more or less perfect carburetting of the gas, but for equalizing or adjusting the pressure of the column of liquid and the gas in the conduit.

I am also aware that platinum has heretofore been employed to ignite gas, and I do not claim broadly its use for this purpose, my claim, as herein indicated, being limited to its combination with a self-opening and closing gas-burner, a combination in which all the parts co-operate to produce a specific result, viz, the letting on and lighting of the gas.

After having thus shown the practicability and great utility of my invention, and especially having shown that without the employment of an extra main pipe and branches, or of electricity, any number of burners may be opened, lighted, and extinguished at the will of one man, and be re-ignited at any time that the gas may be blown out,

What I claim, and desire to secure by Letters Patent, is—

1. The method, herein described, of letting on the gas to the burner or shutting it off therefrom, by the employment, in connection with the pipe or conduit for supplying gas to one or more burners, of a reservoir of quicksilver, glycerine, oils, or other non-freezing liquid in which the end of said conduit is immersed, the pressure of the gas in such conduit being regulated in the manner specified, so that, so long as the pressure does not exceed a certain limit, the gas will be retained in its conduit by the resistance of the said liquid, without the use of stop-cocks or other means ordinarily employed, but whenever the pressure is increased so as to exceed the said limit, the gas will overcome the resistance of the liquid, and pass from its conduit to the burner, as set forth.

2. The use and application, for the purposes specified in the preceding clause, of naphtha or other hydrocarbon-liquid, substantially in the manner described, so that the said liquid shall not only constitute the stop-cock of the gas-conduit, but shall also carburet the gas when the latter is forced through it by the presence of the gas in said conduit.

3. The combination, with a reservoir containing quicksilver or other suitable liquid, and carrying the gas-burner, of the bent end of the gas-induction pipe, held within the reservoir, and arranged as described, so as to be adjusted to a greater or less depth in the liquid in which it is immersed, the said liquid operating, in connection with the pressure of gas in said pipe, to shut off and let on the gas to the burner, as set forth.

4. The combination with a burner to which the flow of gas is regulated by means of quicksilver, oils, or other liquids, in connection with the pressure of gas in the gas-conduit, as described, of a gas-igniting device, composed of spongy or finely-divided platinum, arranged above the orifice of the burner, so as to be brought in contact with the gas issuing therefrom, as and for the purposes set forth.

In testimony whereof, I have signed my name to this specification before two subscribing witnesses.

ARTHUR BARBARIN.

Witnesses:
JOSEPH DEMORUELLE,
IRYL BARTLETT.